US012593835B2

(12) United States Patent
Von Blerk

(10) Patent No.: US 12,593,835 B2
(45) Date of Patent: Apr. 7, 2026

(54) SHARK REPELLENT SYSTEM

(71) Applicant: KWAZULU-NATAL SHARKS BOARD, Durban (ZA)

(72) Inventor: Paul Warren Von Blerk, Durban (ZA)

(73) Assignee: KWAZULU-NATAL SHARKS BOARD, Durban (ZA)

( * ) Notice: Subject to any disclaimer, the term of this patent is extended or adjusted under 35 U.S.C. 154(b) by 208 days.

(21) Appl. No.: 18/572,389

(22) PCT Filed: Oct. 26, 2021

(86) PCT No.: PCT/IB2021/059860
§ 371 (c)(1),
(2) Date: Dec. 20, 2023

(87) PCT Pub. No.: WO2023/275605
PCT Pub. Date: Jan. 5, 2023

(65) Prior Publication Data
US 2024/0284898 A1 Aug. 29, 2024

(30) Foreign Application Priority Data
Jun. 28, 2021 (ZA) .................................. 2021/04436

(51) Int. Cl.
*A01M 29/24* (2011.01)
*A01M 29/30* (2011.01)

(52) U.S. Cl.
CPC ............ *A01M 29/24* (2013.01); *A01M 29/30* (2013.01)

(58) Field of Classification Search
CPC ........ A01M 29/24; A01M 29/30; A01K 79/02
See application file for complete search history.

(56) References Cited

U.S. PATENT DOCUMENTS 4,879,833 A * 11/1989 Threlkeld ............. A01M 29/16
43/17.1
7,302,905 B1 * 12/2007 Wynne ..................... B63C 9/00
441/74

(Continued)

FOREIGN PATENT DOCUMENTS

NZ 260831 A 3/1997
WO WO 2015/068873 A1 5/2015

OTHER PUBLICATIONS

International Search Report for PCT/IB2021/059860 (ISA/EP) mailed Mar. 18, 2022 (4 pages).

(Continued)

*Primary Examiner* — Amine Benlagsir
(74) *Attorney, Agent, or Firm* — ALSTON & BIRD LLP

(57) ABSTRACT

A shark repellent system includes a barrier, a controller and at least one remote device wirelessly connected to the barrier. The barrier is configured to be positioned in the ocean and includes a plurality of electronic pods configured to be spaced apart along a length of the barrier. Each pod has an electrode attached thereto and the pods are configured to apply electrical pulses to the electrodes to form an electric field between adjacent electrodes, thereby repelling sharks from the vicinity of the electrode. The system includes a mooring arrangement for securing the barrier to a structure, vessel or coastal feature. The controller is configured to transmit firing instructions to the pods in order to coordinate the electrical pulses generated, and is configured to monitor operation or status of the pods. The remote device permits a user to remotely control and monitor the barrier, individual pods or the controller.

19 Claims, 15 Drawing Sheets

(56) References Cited

U.S. PATENT DOCUMENTS

| | | | | |
|---|---|---|---|---|
| 7,575,765 | B1 * | 8/2009 | Hughes | A61Q 17/02 |
| | | | | 424/770 |
| 8,793,930 | B2 * | 8/2014 | Chilton | A01G 13/105 |
| | | | | 43/131 |
| 8,988,226 | B2 * | 3/2015 | Vinano | A01K 79/02 |
| | | | | 119/908 |
| 9,108,707 | B2 * | 8/2015 | Pradeep | A01M 29/24 |
| 9,763,438 | B2 * | 9/2017 | Munsell | A01N 65/22 |
| 2003/0051674 | A1 | 3/2003 | Leblanc | |
| 2006/0135010 | A1 * | 6/2006 | Moeller | B63C 11/02 |
| | | | | 441/64 |
| 2008/0178791 | A1 * | 7/2008 | Sullivan | A01M 29/06 |
| | | | | 116/22 A |
| 2015/0321737 | A1 | 11/2015 | O'Connell et al. | |
| 2018/0146655 | A1 * | 5/2018 | Crossen | A01K 99/00 |
| 2019/0059343 | A1 * | 2/2019 | Erlendson | A01K 65/00 |
| 2020/0305410 | A1 * | 10/2020 | Romano | A01M 29/30 |
| 2021/0029985 | A1 * | 2/2021 | Watson | A41D 13/0125 |

OTHER PUBLICATIONS

Written Opinion for PCT/IB2021/059860 (ISA/EP) mailed Mar. 18, 2022 (6 pages).
International Preliminary Report on Patentability for PCT/IB/2021/059860 (IPEA/EP) completed Jul. 11, 2023 (5 pages).

* cited by examiner

210

220

230

240

SHARK REPELLENT SYSTEM

CROSS-REFERENCE TO RELATED APPLICATIONS

This application is a national phase entry of International Application No. PCT/IB2021/059860, filed Oct. 26, 2021, which claims priority to South African Application No. 2021/04436, filed Jun. 28, 2021, the contents of which are hereby incorporated by reference in their entirety.

FIELD OF THE INVENTION

The invention relates to shark repellent systems. Although the invention is referred to as a repellent system for sharks, it should be appreciated that embodiments of the invention may be employed to repel other aquatic animals and particularly others in the subclass Elasmobranchii. The term "shark" should thus be interpreted broadly throughout this specification.

BACKGROUND TO THE INVENTION

Various shark repellent devices have been proposed over the years. A number of these devices rely on the electro-reception of sharks and are thus designed to exploit the fact that sharks have highly sensitive electrical receptors in their snouts, known as the ampullae of Lorenzini. It has been shown that at least some types of sharks can be repelled by creating an electric field in the sea water and applying electrical pulses with specific properties thereto.

In the 1990s, the Natal Sharks Board, established in terms of section 2 of the Natal Sharks Board Ordinance, 1964 (Ordinance No. 10 of 1964) of South Africa, developed a method and apparatus for repelling sharks. This invention was patented in South Africa as South African Patent No. 1994/04537, and in a number of other countries including in the United States of America as U.S. Pat. No. 5,566,643 (the contents of which is incorporated by reference herein in its entirety).

The KwaZulu-Natal Sharks Board Act No. 5 of 2008 of South Africa repealed the Natal Sharks Board Ordinance, 1964, and established the applicant as the KwaZulu-Natal Sharks Board. The applicant is the legal successor to the Natal Sharks Board.

The now expired patent of the applicant's legal predecessor teaches the control of sharks through immersing electrodes in water and creating an electric field between the electrodes by applying electrical pulses thereto. The inventors of this patent found that sharks can be repelled when utilising pulses having a duration of between 0.1 and 200 ms, a pulse repetition rate of between 1 and 60 Hz, and a field strength in the water, at a distance of 1 m, of 1 to 10 V·m⁻¹.

The original electrical wave-form used in the technology of the applicant's legal predecessor was incorporated into personal safety devices known commercially as "Shark-POD" ("Protective Oceanic Device") and "SharkShield", the latter still being sold today. These personal safety devices are configured to be mounted to surfboards, attached to divers' ankles or (more recently) to be hand-held, utilising a pair of electrodes and applying this wave-form technology to emit a three-dimensional field around the user, thereby repelling sharks in the vicinity of the user.

Several studies have confirmed the effectiveness of the original technology of the applicant's legal predecessor in repelling predators and preventing attacks. A 2012 study, for example, found that a personal safety device such as the "SharkPOD" significantly increases the amount of time it would take a shark to approach and attack bait. Furthermore, research conducted by the University of Pretoria in South Africa found that such a device could reduce the probability of an attack from about 0.70% to 0.08%.

While these safety devices have proven to be relatively effective in repelling sharks, there is a need for a shark repellent system that can keep an entire area free of sharks without having to equip each individual in the area with a safety device. In order to achieve this, it is preferable to create a barrier which prevents or deters sharks from reaching bathers, surfers and divers in the area.

Conventionally, partial barriers are formed using shark nets (sometimes in combination with drum lines). However, these have numerous drawbacks, including the fact that aquatic animals can become entangled, stuck, injured or even killed as a result of contact with such devices. It is often necessary to free animals manually from these devices.

The applicant is aware of more advanced barrier systems, such as the "SharkSafe Barrier" which bio-mimics the visual effects of a kelp forest and combines this with a series of permanent magnet stimuli to form a type of barrier that dissuades sharks from passing through. While these and other barrier systems are effective to a certain extent, the applicant believes that they fail to provide a comprehensive solution. In particular, the applicant identified a need for an improved shark repellent system which, among other requirements, is not lethal to aquatic animals and does not entangle them, is based on proven repellent technology, can be controlled and monitored from land, and is relatively easy to install, remove and relocate.

Embodiments of the present invention aim to address the needs identified above, at least to some extent.

SUMMARY OF THE INVENTION

Broadly, in accordance with a first aspect of the invention, there is provided a shark repellent system comprising:

a shark repellent barrier configured to be positioned in the ocean and which includes a plurality of electronic pods configured to be spaced apart along a length of the barrier, wherein each pod has an electrode attached thereto, the electrode being configured to extend substantially vertically from the pod through the water, in use, and the pods being configured to apply electrical pulses to the electrodes to form an electric field between adjacent electrodes, wherein the barrier is configured to generate an electric field strength, at a distance of 1 m, of at least 1 V·m⁻¹ substantially along its length to repel sharks from the vicinity of the electrodes, a supply cable for supplying electrical power to the pods, each pod being connected to the supply cable, and a mooring arrangement for securing the barrier to a structure, vessel or coastal feature;

a controller connected to the barrier via the supply cable and/or mooring arrangement, wherein the controller is configured to transmit firing instructions to the pods in order to coordinate the electrical pulses generated, and is configured to monitor operation and/or status of the pods; and at least one remote device wirelessly connected to the controller, wherein the remote device is configured to permit a user of the remote device to:

remotely activate and deactivate the barrier, individual pods and/or the controller, check feedback from the controller regarding the operation and/or status of the pods, and carry out testing of the barrier and/or the controller.

More specifically, according to a first aspect of the invention, the electronic pods are buoyant electronic pods configured to be spaced apart along the length of the barrier, wherein the electrode attached to each pod is configured to be suspended downwardly from the pod through the water, in use. This may define a fully floating barrier not anchored to an ocean floor.

Accordingly one aspect of the invention provides a shark repellent system comprising:

a shark repellent barrier configured to be positioned in the ocean and which includes a plurality of buoyant electronic pods configured to be spaced apart along a length of the barrier, wherein each pod has an electrode attached thereto, the electrode being configured to be suspended downwardly from the pod through the water, in use, and the pods being configured to apply electrical pulses to the electrodes to form an electric field between adjacent electrodes, wherein the barrier is configured to generate an electric field strength, at a distance of 1 m, of at least 1 V·m⁻¹ substantially along its length to repel sharks from the vicinity of the electrodes, a supply cable for supplying electrical power to the pods, each pod being connected to the supply cable, and a mooring arrangement for securing the barrier to a structure, vessel or coastal feature;

a controller connected to the barrier via the supply cable and/or mooring arrangement, wherein the controller is configured to transmit firing instructions to the pods in order to coordinate the electrical pulses generated, and is configured to monitor the operation and/or status of the pods; and at least one remote device wirelessly connected to the controller, wherein the remote device is configured to permit a user to remotely activate and deactivate the barrier, individual pods and/or the controller, to check feedback from the controller regarding the operation and/or status of the pods and to carry out testing of the barrier and/or the controller.

The barrier may include floats or buoys located between the electronic pods to ensure that the pods remain at or near an ocean surface, in use. The pods, floats and supply cable may be connected to each other by way of a pod cable/rope arrangement.

The barrier may be configured such that the electrodes are spaced between about 2 m and 4 m apart, in use, with a differential voltage between the adjacent electrodes of at least 100 V to 120 V.

The barrier thus defines a row of pods and electrodes, the length of which may be varied. The barrier may have any suitable length and may include a suitable number of pods and electrodes, depending on requirements, e.g. a length of between 50 m and 300 m. In use, multiple rows may be positioned in parallel or in series. In some cases, more than one row/barrier may be connected to the same controller.

Each pod has a water-impermeable cover which houses pod electronics. The length of electrodes used may be varied, depending on the installation. For instance, they may be between 3 m and 15 m in length. The electrodes may be selected such that the barrier generates the electric field continuously from about 100 to 300 mm below the ocean surface to about 400 to 600 mm above the ocean floor.

The electric field of at least 1 V·m⁻¹ may extend substantially along the entire the length of the barrier, measured at a centreline of the pod cable. The distance of 1 m referred to above in respect of the electric field strength is taken from the centreline in the vicinity of the relevant electrodes.

The mooring arrangement may be selected or adapted based on the requirements of the installation and deployment terrain. For instance, it may consist of ropes and anchors to keep the barrier in place against wave action. The mooring arrangement may be selected so as to facilitate relocation of the barrier.

The controller may instruct the pods to fire in such a manner that electric field polarity is reversed periodically or such that polarity is alternated. The controller may be a control unit.

The barrier may be configured to apply a pulse waveform in the shape of a standard exponential decay waveform with a time constant of about 0.3±0.05 ms. The waveform may be defined as follows:

$$\varepsilon(t) = \varepsilon_{Peak} e^{-t/T},$$

where $\varepsilon_{Peak}$ is the peak electric field strength, t is time in seconds and T is the time constant. The pulse repetition rate may be around 1 s for alternating pulses. Accordingly, each pod may fire around every 2 s.

The controller may be configured to transmit at least the following feedback to the remote device: operational status of the controller, operational status and performance of each pod, supply current and/or voltage to each pod (preferably over time), and/or data relating to or reports on testing of system components.

The controller may be portable and configured to be positioned close to (in close proximity to) the mooring arrangement, e.g. on a boat, jetty, or a natural coastal feature. The controller may be connected to a suitable power supply such as a mains power supply (220/230 V, single phase 50 Hz) and may also be connected to the Internet, in a wired or wireless manner, such that it can communicate with the remote device.

In a preferred embodiment, the system includes two types of remote devices, referred to in this specification as a "remote station" and a "remote monitoring device".

The remote station may be a dedicated, fixed physical station, e.g. at a maintenance office, communicatively connected to the controller for detailed or sophisticated testing of the pods and to evaluate the status of all of the pods in the system. The remote station may be used to record all data logged/received by the controller.

For instance, the controller may wirelessly transmit operational status and performance (e.g. current/voltage) data received from the pods to the remote station, allowing graphic display of data at the maintenance office, e.g. displaying the operation/performance of each pod. The remote station may include at least one computing device with suitable software and/or software application/s configured to provide the functionality described herein. The remote station may also be used to switch the barrier on/off and to test the barrier.

The remote monitoring device may be a mobile communications device, preferably a mobile phone, tablet or laptop, primarily used to switch the barrier on/off and test the barrier. The remote monitoring device may be used to access an application or website via the Internet which provides a visual display of the functionality and status of each pod. In some embodiments, the remote monitoring device may be used to log into the system remotely and perform "Go/No Go" tests on the pods.

In some embodiments, the system may be configured to trigger an alarm message when a failure or danger is detected. The alarm message may triggered when the controller or the remote device detects that one of the pods is not operational or not functioning correctly. For instance, if the software/application installed at the remote station or remote monitoring device detects that a pod is not operational, or not functioning correctly (e.g. current too high or too low), an alarm message may be triggered. The alarm message may for instance be sent to a specific phone number, e.g. via a GSM or GPRS module in the controller, or to a specific e-mail address via the remote station (through the Internet).

It should be appreciated that the barrier and controller are substantially "mobile" in embodiments of the invention (with the barrier preferably being fully floating), meaning that they are easy to deploy and to move from one location to the next.

It may be desirable to employ a "reverse" barrier configuration in which the pods do not float, i.e. one in which the pods are located at or near the ocean floor with the electrodes extending upwardly from the pods up to a level at or near the ocean surface. This may, for instance, be useful in zones traversed by boats and the like.

According to a second aspect of the invention, the electronic pods are not "floating" and are configured to be spaced apart along the length of the barrier at or near the ocean floor, wherein the electrode attached to each pod is configured to extend upwardly from the pod through the water, in use.

Accordingly, the invention extends to a shark repellent system comprising:

a shark repellent barrier configured to be positioned in the ocean and which includes a plurality of electronic pods configured to be spaced apart along a length of the barrier at or near the ocean floor, wherein each pod has an electrode attached thereto, the electrode being configured to extend upwardly from the pod through the water, in use, and the pods being configured to apply electrical pulses to the electrodes to form an electric field between adjacent electrodes, wherein the barrier is configured to generate an electric field strength, at a distance of 1 m, of at least 1 V·m$^{-1}$ substantially along its length to repel sharks from the vicinity of the electrodes, a supply cable for supplying electrical power to the pods, each pod being connected to the supply cable, and a mooring arrangement for securing the barrier to a structure, vessel or coastal feature;

a controller connected to the barrier via the supply cable and/or mooring arrangement, wherein the controller is configured to transmit firing instructions to the pods in order to coordinate the electrical pulses generated, and is configured to monitor the operation and/or status of the pods; and at least one remote device wirelessly connected to the controller, wherein the remote device is configured to permit a user to remotely activate and deactivate the barrier, individual pods and/or the controller, to check feedback from the controller regarding the operation and/or status of the pods and to carry out testing of the barrier and/or the controller.

The pods may be anchored to the ocean floor in any suitable manner. The electrodes may be buoyant and/or may be attached to buoyant elements such as floats.

The invention extends to a method of repelling sharks. The method may include installing a system substantially as described above, with the barrier being installed in the ocean according to the first or second aspect of the invention, generating an electric field in the manner described above to repel sharks from the vicinity of the barrier, and controlling and/or monitoring the barrier using the controller and the remote device(s) (i.e. the remote station and/or the remote monitoring device).

Accordingly another aspect of the invention provides a method of repelling sharks, comprising:

deploying a system substantially as described above such that the barrier of the system is installed in the ocean;

generating an electric field to repel sharks from the vicinity of the barrier; and controlling and monitoring the barrier using the controller and the at least one remote device of the system.

BRIEF DESCRIPTION OF THE DRAWINGS

The invention will now be further described, by way of example, with reference to the accompanying drawings. In the drawings.

DETAILED DESCRIPTION WITH REFERENCE
TO THE DRAWINGS

The following description is provided as an enabling teaching of the invention, is illustrative of principles associated with the invention and is not intended to limit the scope of the invention. Changes may be made to the embodiment/s described, while still attaining results of the present invention and/or without departing from the scope of the invention. Furthermore, it will be understood that some results or advantages of the present invention may be attained by selecting some of the features of the present invention without utilising other features.

Accordingly, those skilled in the art will recognise that modifications and adaptations to the present invention may be possible and may even be desirable in certain circumstances, and may form part of the present invention.

Figure 1:
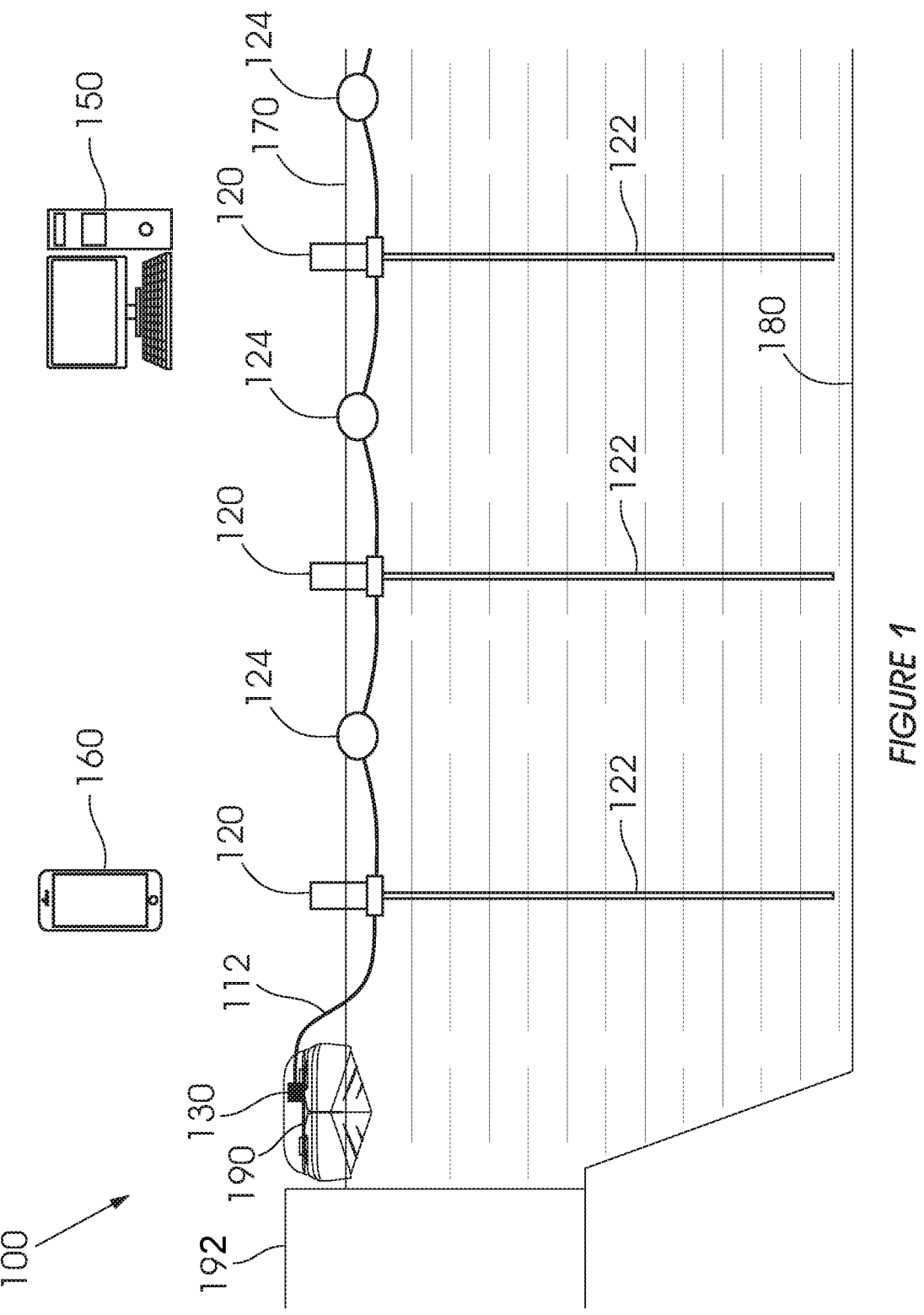
FIG. 1 is a schematic illustration of an embodiment of a shark repellent system according to the invention.
Figure 2:
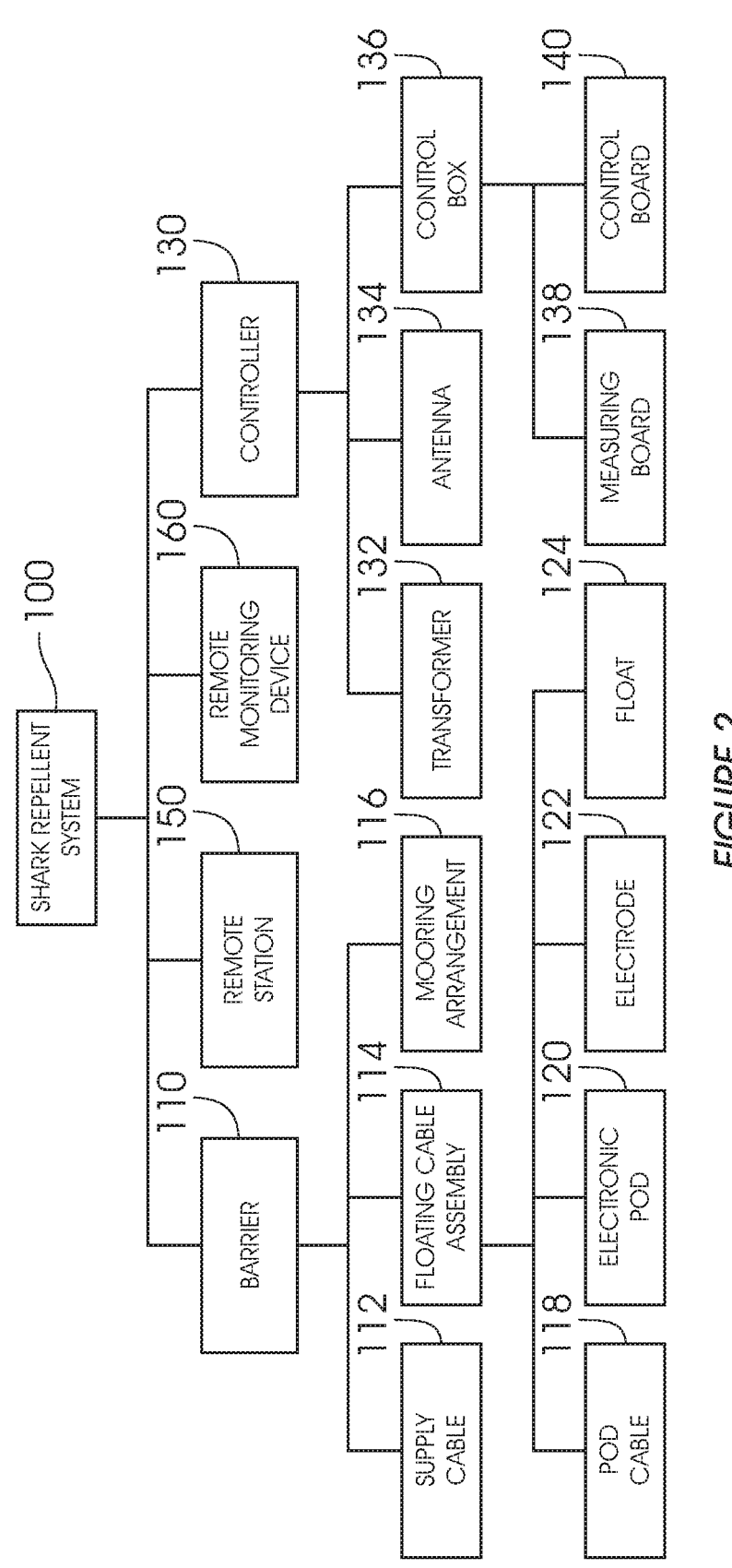
FIG. 2 is a block diagram illustrating certain components of the shark repellent system of FIG. 1.

A shark repellent system 100 according to an embodiment of the invention is illustrated at a high level in FIG. 1 and key components thereof are illustrated in a family tree type block diagram in FIG. 2.

The system 100 includes a shark repellent barrier 110, a controller 130, a remote station 150 and a remote monitoring device 160.

The barrier 110 is deployed at sea to deter sharks from entering an area used by humans. The barrier 110 creates an electric field in the sea water that repels sharks from the barrier 110. When a shark comes within a few meters of the barrier, the electrical field emitted by the barrier 110 causes the shark to experience a high level of discomfort. This does not harm the shark, but merely causes it to move away. In this embodiment, the electric field of the barrier 110 is such that it only affects certain animals in the subclass Elasmobranchii, specifically sharks and rays, due to the presence a sensory organ called the ampullae of Lorenzini, and tests have shown that it has no notable effect on other marine life or humans.

The barrier 110 has a supply cable 112 feeding electrical power from a controller 130 of the system 100 to a floating cable assembly 114 that is deployed in the ocean. The floating cable assembly 114 includes a plurality of floating/buoyant electronic pods 120 spaced apart in a row and connected to the supply cable 112 using a pod cable 118. The pod cable 118 may be in the form of a rope with sufficient strength bearing properties, e.g. capable of bearing more than 200 kg. Floats 124 are employed to keep the pods 120 at or near the sea surface 170.

An electrode 122 is connected to each pod 120. The electrode 122 is operatively suspended downwardly from the pod 120 through the water, in use, as shown in FIG. 1. Each electrode 122 extends from its respective pod 120 to a point close to the sea bottom 180. In this non-limiting example, the electrodes 122 have a length of 12 m. The pods 120 are configured to apply electrical pulses to the electrodes 122 to form an electric field between adjacent electrodes. An electric field with a strength of at least 1 V·m$^{-1}$ (taken at a distance of 1 m from the centreline at the relevant electrode pair) is emitted substantially along the length of the barrier 110 to repel sharks from the vicinity of the electrodes.

The system 100 includes a suitable mooring arrangement 116 for securing the barrier 110 to a natural coastal feature, a structure (e.g. the controller 130 or a jetty 192) or boat 190. The mooring arrangement 116 used will depend on the deployment purpose and terrain. In the example of FIG. 1, the system 100 is deployed from a boat 190 with the controller 130 located on the boat 190.

Figure 8:
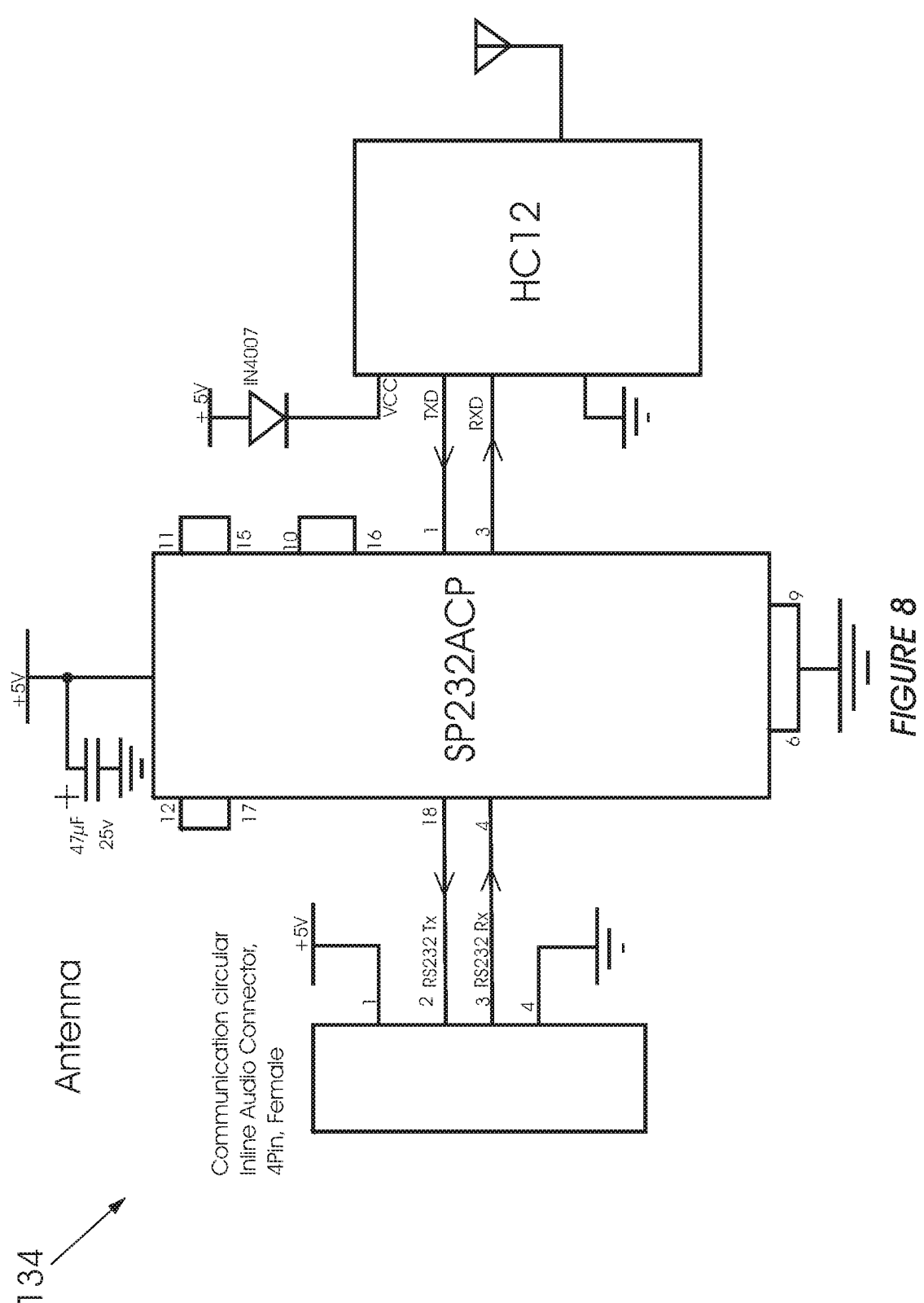
FIG. 8 is a circuit diagram for an exemplary antenna which may be used in the shark repellent system of FIG. 1.

The controller 130 is configured to transmit firing instructions to the pods 120 in order to coordinate the electrical pulses generated and can also monitor the operation and/or status of the individual pods 120. Typically, the controller 130 may include a transformer 132 for transferring the electrical energy from a 220/230 V power supply to the barrier circuit 110 at a lower voltage. The controller 130 may also include an antenna 134 for radio communications with one or both of the pods 120 and remote devices and a control box 136 containing a measuring board 138 and control board 140. An exemplary wiring diagram for the antenna 134 is shown in FIG. 8. The controller 130 may be configured to perform measurements on the pods 120 separately, e.g. every hour, with results uploaded to the remote station 150.

In this example of the invention, the remote station 150 is a dedicated physical station located at a maintenance office. The remote station 150 includes a computer system that communicates with the controller 130 via the Internet. This allows a user to remotely activate and deactivate the barrier 110 by sending instructions from the station 150 to the controller 130, as well as to check feedback from the controller 130 regarding the operation and/or status of the pods 120, and to carry out testing of the barrier 110. The remote station 150 can also be used to record/store all of the data logged by the controller 130. It will be appreciated that the remote station 150 or parts thereof may be cloud-based and need not be in a single physical location.

The remote monitoring device 160 is, in this example, a mobile phone with a monitoring application installed thereof. The user can log into the monitoring application so as to communicate with the remote station 150 or the controller 130 over the Internet. The monitoring application may be used to monitor the status and performance of the barrier 110, e.g. to check individual pods 120 for possible "holes" in the barrier 110 as a result of pods 120 not functioning correctly. The monitoring application may also be used to test the barrier 110 and to activate or deactivate the barrier 110 or even individual pods 120.

The system 100 may include suitable software configured to identify issues and report the issues by sending warning messages to the station 150, the device 160 or to another device. For instance, the system 100 may measure the current through the current measuring board 138 and identify that the current being supplied to one of the pods 120 is too low, and then send a warning e-mail to a predefined e-mail address of the user, allowing the user to take swift action.

Figure 3:
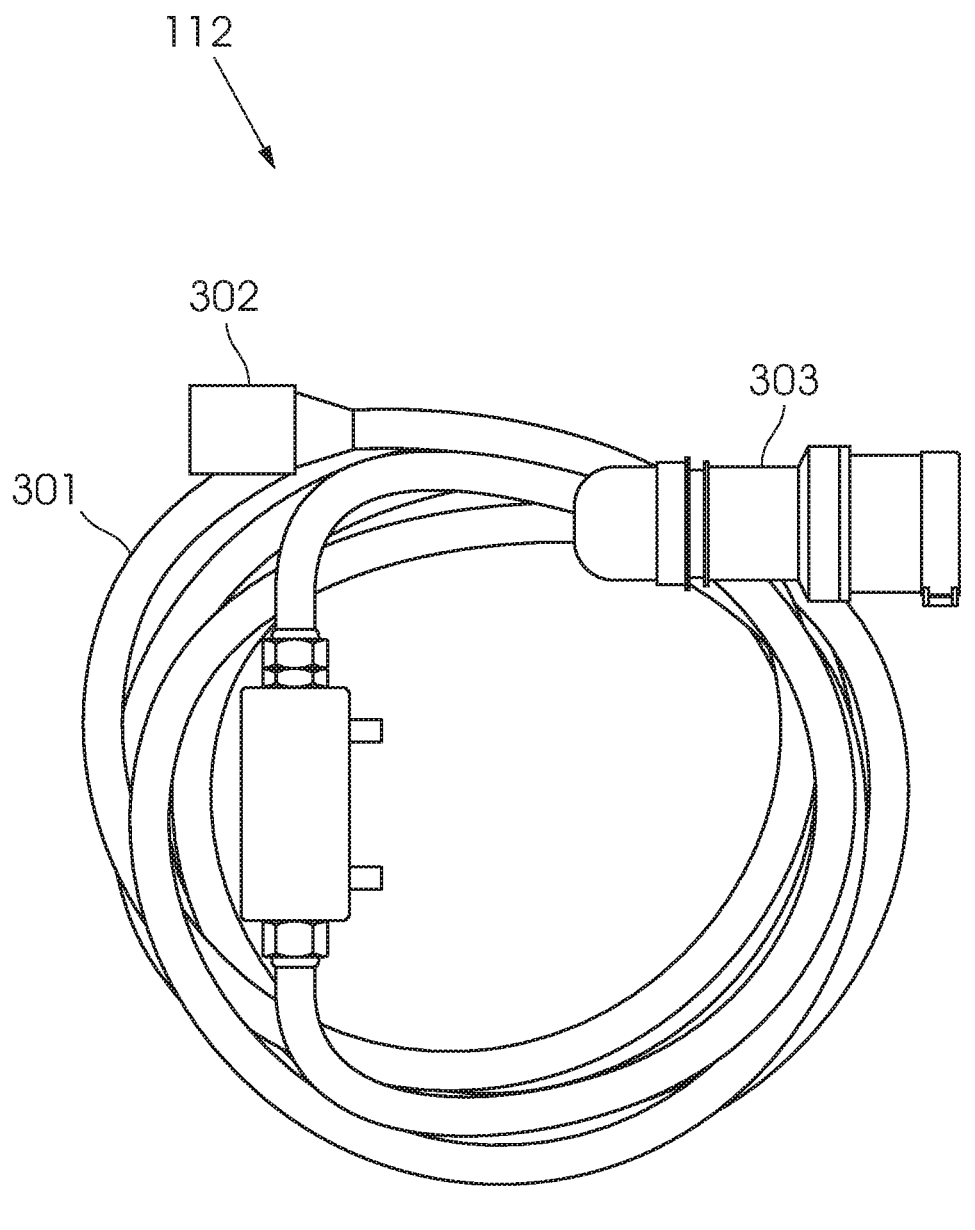
FIG. 3 is an example of a supply cable which may be used in the shark repellent system of FIG. 1.

An exemplary supply cable 112 is shown in FIG. 3. Primary components of the cable are shown in Table 1 below:

TABLE 1

| Components of an exemplary supply cable | |
|---|---|
| Reference numeral | Component |
| 301 | Cable: four-core, 2.5 mm$^2$ with 12.5 mm outside diameter |
| 302 | Subconn underwater connector 8 pin, male |
| 303 | IP44 red cable mount 3P + E industrial power plug, 16A, 415 V |

Figure 4:
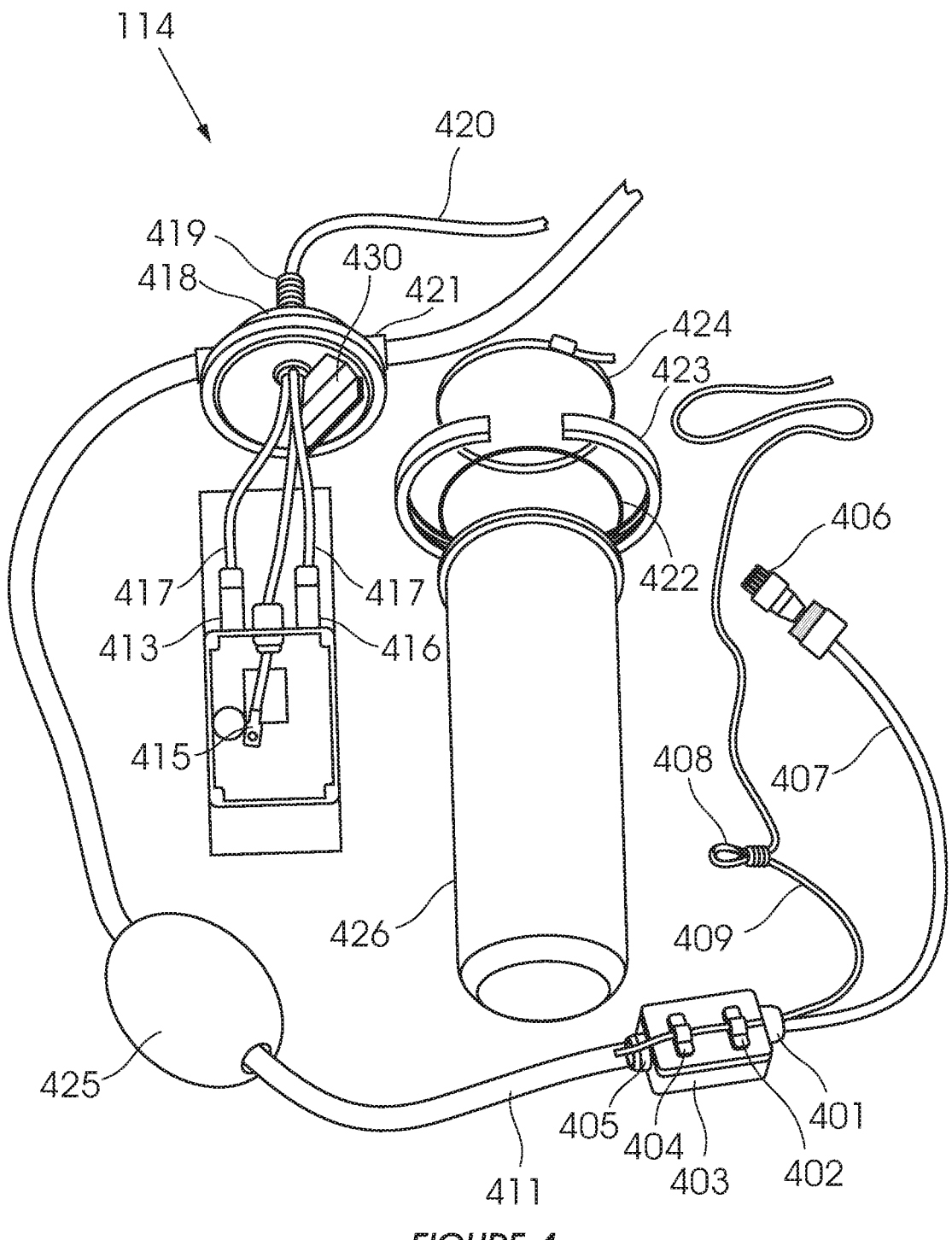
FIG. 4 is an example of parts of a floating cable assembly which may be used in the shark repellent system of FIG. 1.

An exemplary floating cable assembly 114 is shown in FIG. 4. Primary components of the assembly are shown in Table 2 below.

Items 401 to 412 in FIG. 4 are situated at each end of the cable while the rest of the items are repeated for every 3 m on the cable (this may be more or less, depending on the installation).

TABLE 2

| Components of an exemplary floating cable assembly | | |
| --- | --- | --- |
| Reference numeral | Component | Quantity |
| 401 | Cable gland, black, M20 × 1.5 | 1 |
| 402 | Stainless steel bolts and nuts | 4 |
| 403 | Potting box R1 Hexim | 1 |
| 404 | Fair leads | 2 |
| 405 | Cable gland, while, M20 × 1.5 | 1 |
| 406 | Subconn 8 pin dummy male or female | 1 |
| 407 | Subconn underwater connector | 1 |
| 408 | M5 thimble | 1 |
| 409 | Superbraid 5 mm rope | |
| 411 | 12 mm Baket braid rope | 1 |
| 413 | Solar inline connector M4 female | 1 |
| 415 | 25 × 6 non-insulating ring lug | 1 |
| 416 | Solar inline connector M4 male | 1 |
| 417 | Solar cable 6 mm² | |
| 418 | Manifold | 1 |
| 419 | Spiral gland M20 6-12 | 1 |
| 420 | Battery cable 25 mm² | |
| 421 | Hose connector Emjay 15 ½ | 2 |
| 422 | O-ring 142 × 3 | 1 |
| 423 | Moulded half clamp THC5 | 2 |
| 424 | Hose clamp S/S GSS-123 184 × 209 | 1 |
| 425 | Buoy SHE yellow | 1 |
| 426 | Orange dome body | 1 |
| 430 | Mounting plate bracket | 1 |

The potting box 403 and the lid 431 are filled with casting resin after assembly of the components.

Figure 5:
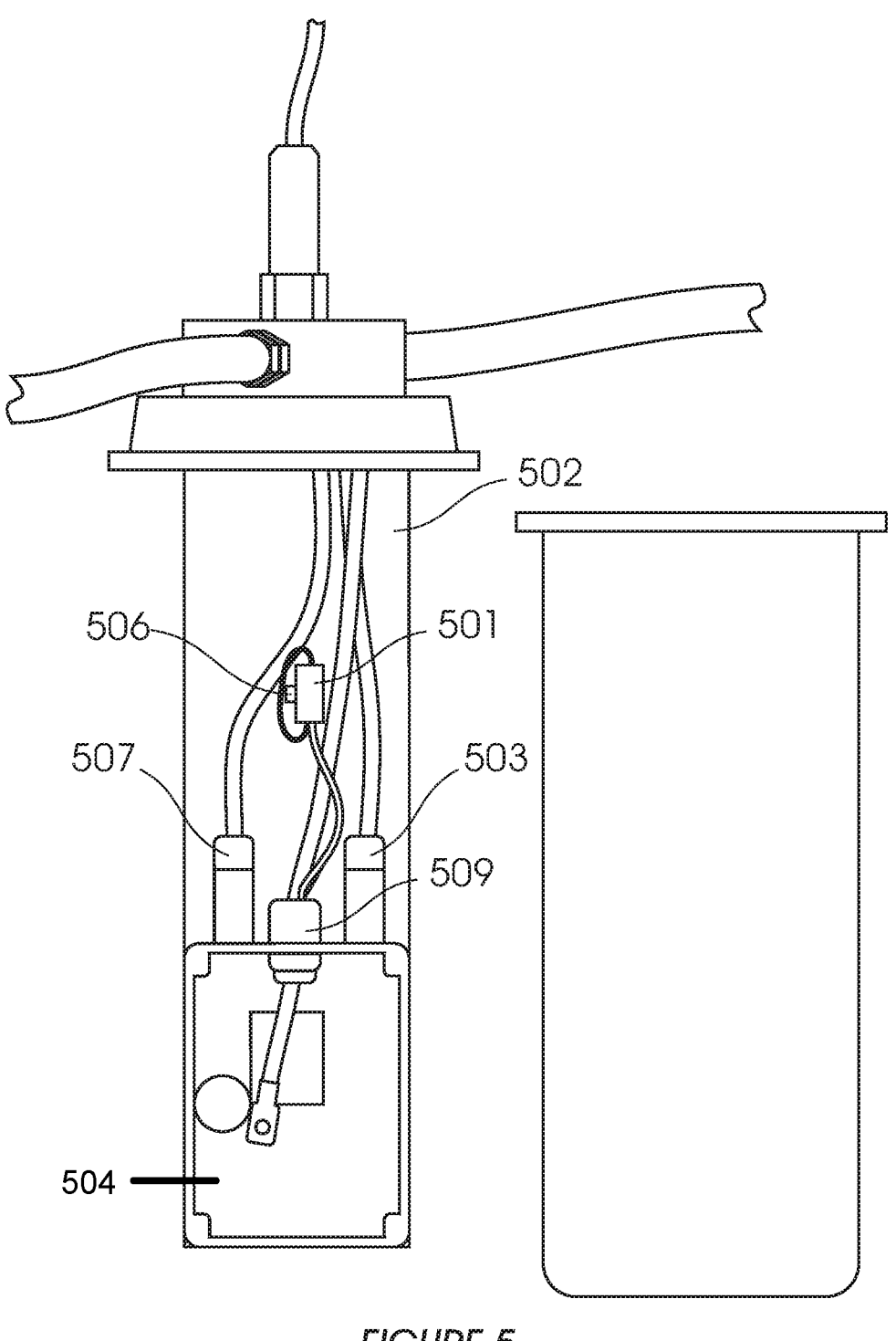
FIG. 5 is an example of a pod electronics assembly which may be used in the shark repellent system of FIG. 1, shown with its cover removed.

FIG. 5 shows an example of the electronics that can be housed in a pod 120 according to the invention. Primary electronics components are shown in Table 3 below. The components are located inside of the assembled pod's body 426 and the PCB potting box 504 is filled with casting resin after assembly.

TABLE 3

| Exemplary pod electronics | | |
| --- | --- | --- |
| Reference numeral | Component | Quantity |
| 501 | Resistor, 25 W, T0220 820 Ohm | 1 |
| 502 | Mounting plate, blank 1 | 1 |
| 503 | Solar connector M4 bulkhead male | 1 |
| 504 | PCB potting box 150 × 110 × 70 with floating shark PCB | 1 |
| 506 | M3 × 10 brass cheese head bolt, washer and nut | 2 |
| 507 | Solar connector M4 bulkhead female | 1 |
| 509 | Cable gland white M20 × 1.5 | 1 |

Figure 6:
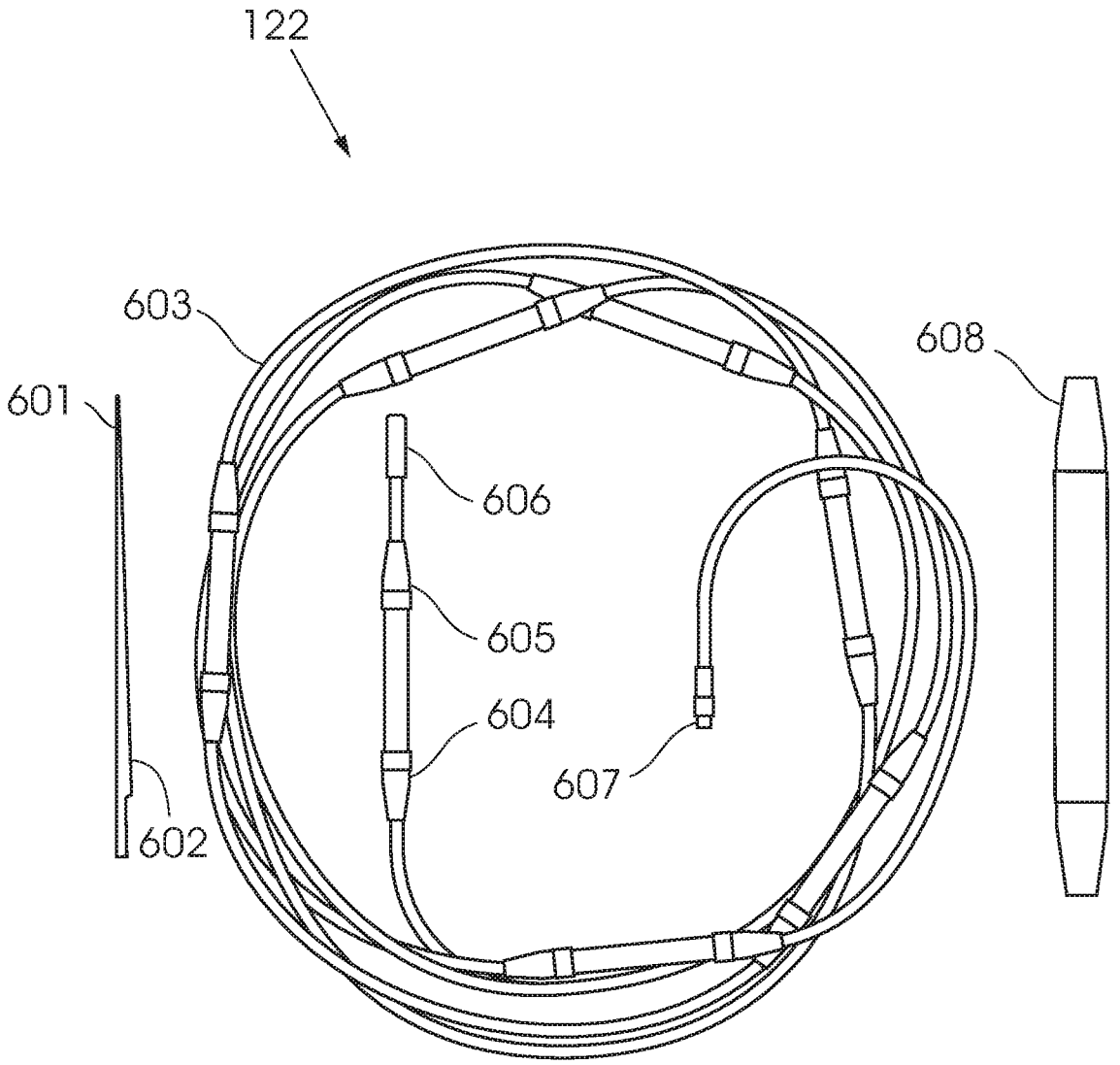
FIG. 6 is an example of an electrode which may be used in the shark repellent system of FIG. 1.

Turning to FIG. 6, an example of an electrode 122 is illustrated. Primary components are shown in Table 4 below.

TABLE 4

| Components of an exemplary electrode | | |
| --- | --- | --- |
| Reference numeral | Component | Quantity |
| 601 | Electrode | 1/elec |
| 602 | Grub screw SS 4 × 5 mm | 4/elec |
| 603 | House wire copper size 25 mm, strand number × diameter 19 × 1.38, max diameter 8.5 mm | |
| 604 | Heat shrink thin wall adhesive | |

TABLE 4-continued

| Components of an exemplary electrode | | |
| --- | --- | --- |
| Reference numeral | Component | Quantity |
| | coated at 19/6-1200 | |
| 605 | Butyl Tape (inside heat shrink) | |
| 606 | Heatshrink end cap TKI 15/5 TKI 10/4 | 1 |
| 607 | Non-insulating ferrules 25 mm/10 | 1 |
| 608 | 12 mm basket braid rope | |

The electrodes are inserted along the cable at appropriate spacings and the braid rope 608 completely covers the electrode.

Figure 7:
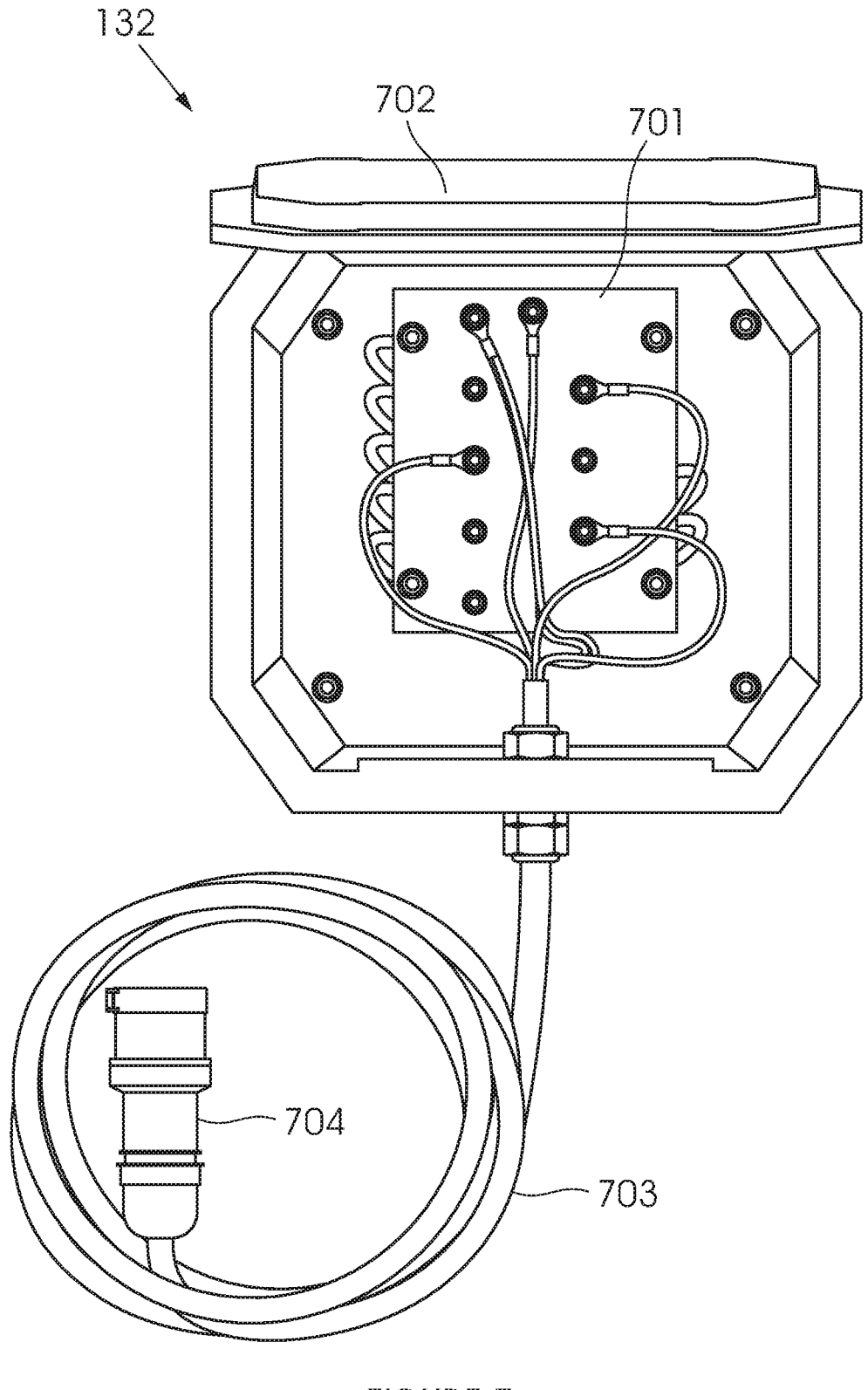
FIG. 7 is an example of a transformer which may be used in the shark repellent system of FIG. 1.

FIG. 7 shows an example of the transformer 132 of the controller 130. Primary components are shown in Table 5 below.

TABLE 5

| Components of an controller transformer | | |
| --- | --- | --- |
| Reference numeral | Component | Quantity |
| 701 | Single phase isolation transformer, 3 KVA Average load 1200 Watts Peak load 3000 Watts Primary 115 VAC and 230 VAC 50 Hz Secondary 0, 120, 130, 140, 150 VAC | 1 |
| 702 | Taktix Container | 1 |
| 703 | 7 core cable 15A | 1 |
| 704 | Glanded plug 3P + N + E 16A 400 V IP44 | 1 |

Figure 9:
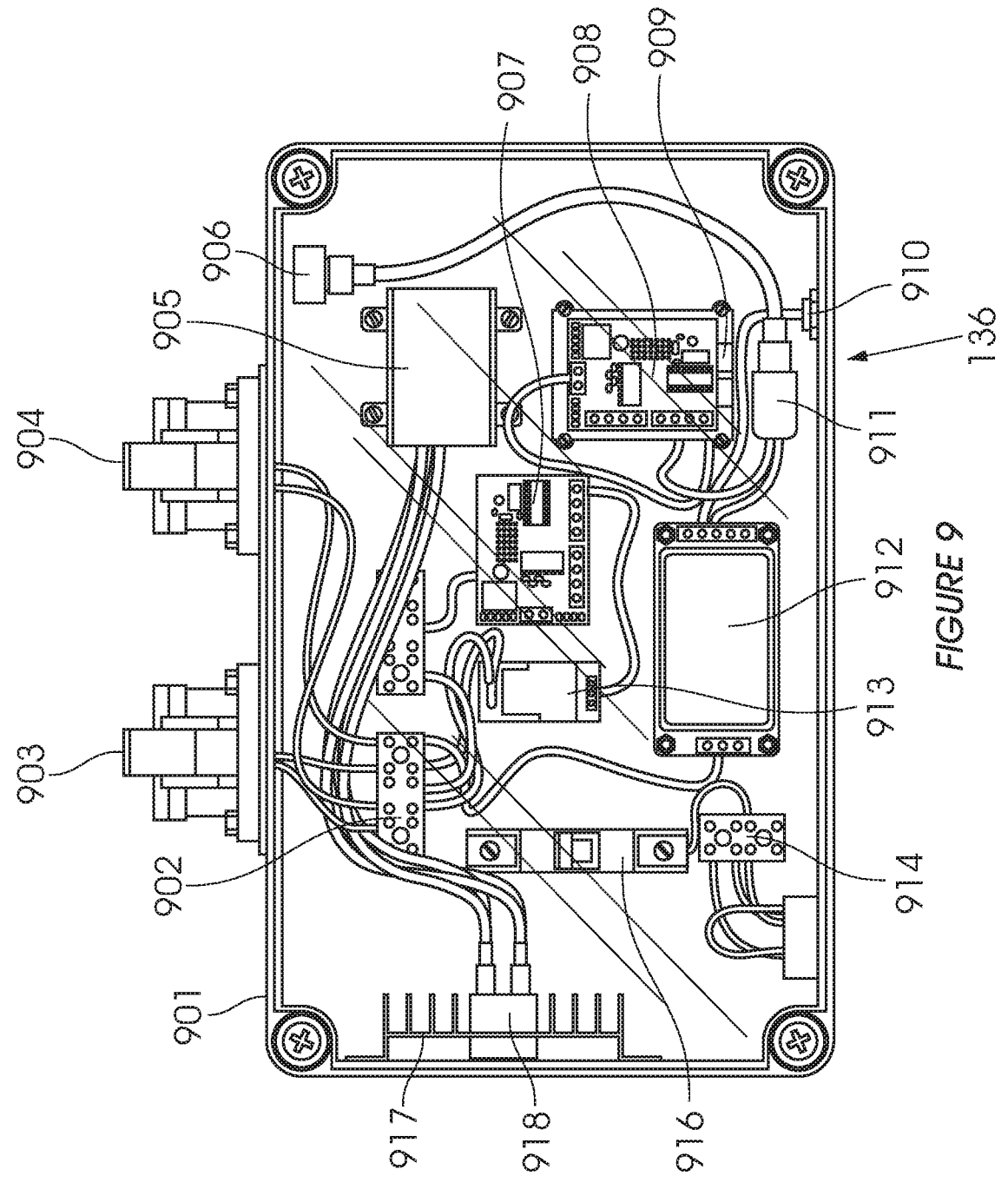
FIG. 9 is an example of a control box which may be used in the shark repellent system of FIG. 1.
Figure 10:
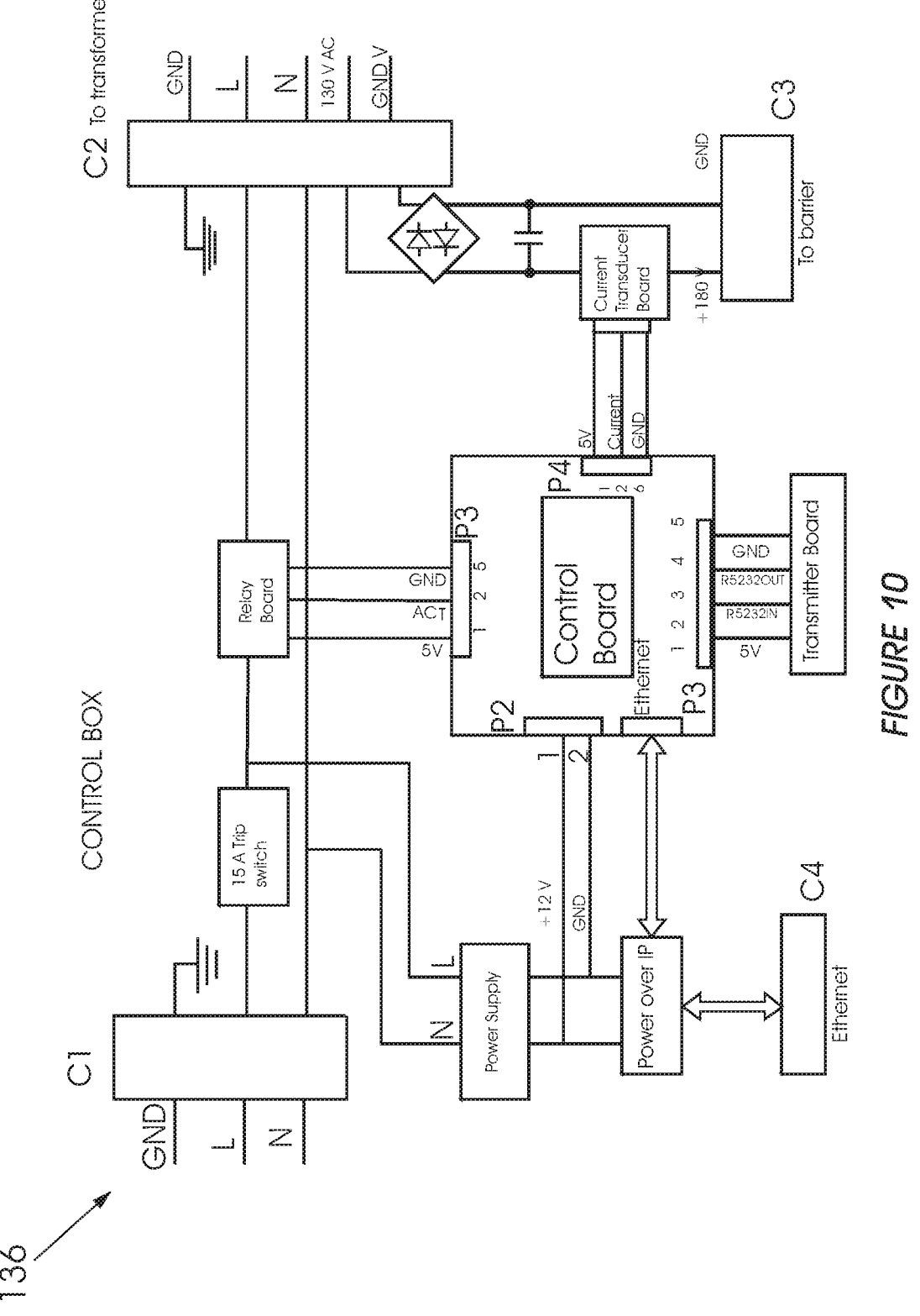
FIG. 10 is a circuit diagram for the control box of FIG. 9.
Figure 11:
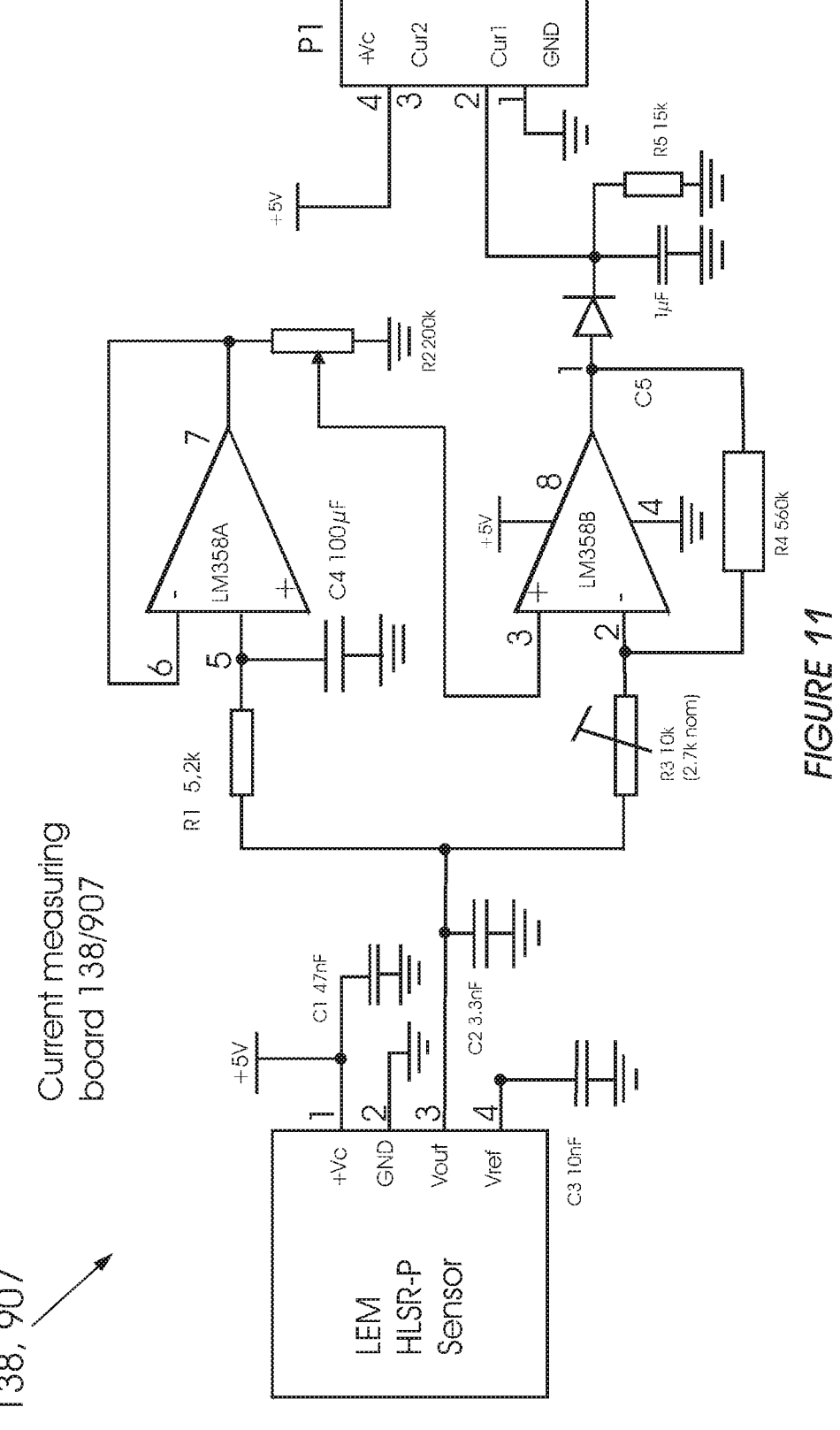
FIG. 11 is a circuit diagram for a current measuring board of the control box of FIG. 9.

Referring now to FIGS. 9 to 11, an example of the control box 136 is illustrated. Primary components are shown in FIG. 9 and detailed in Table 6 below, while FIGS. 10 and 11 are exemplary wiring diagrams for the control box 136 and its current measuring board 138, respectively.

TABLE 6

| Components of an exemplary control box | | |
| --- | --- | --- |
| Reference numeral | Component | Quantity |
| 901 | Fibox EK Polycarbonate Enclosure, IP 66, Flanged, 380 × 280 × 130 mm | 1 |
| 902 | Weidmuller SAK non-fused terminal block, 6 way/pole, screw terminals | 2 |
| 903 | IP44 red panel mount 3P + E heavy duty power connector socket, 16A, 450 V | 1 |
| 904 | IP44 red panel mount 3P + N + E heavy duty power connector socket, 16A, 450 V | 1 |
| 905 | Capacitor, 10 000 μF, 250 V | 2 |
| 906 | Bulgin Cat5e 8-way female RJ45 connector straight panel mount shielded | 1 |
| 907 | Current measuring board | 1 |
| 908 | Control board | 1 |
| 909 | Raspberry Pi 2 B SBC Computer Board | 1 |
| 910 | Circular Panel Mount audio connector, Male, 4 Pin | 1 |
| 911 | Power over Ethernet adapter | 1 |
| 912 | Tracopower, 40 W embedded switch mode power supply SMPS, +/−12 V DC | 1 |
| 913 | Relay control PCB | 1 |
| 914 | Weidmuller SAK non-fused terminal block, 4 way/pole, screw terminals | 1 |

TABLE 6-continued

Components of an exemplary control box

| Reference numeral | Component | Quantity |
| --- | --- | --- |
| 916 | Mini rail circuit breaker 10A - slow trip | 1 |
| 917 | Heat sink | 1 |
| 918 | Bridge rectifier, 35A, 1000 V | 1 |

Components of an exemplary shark repellent system 100 according to the invention were tested and some of the results are set out below.

Figures 12, 13:
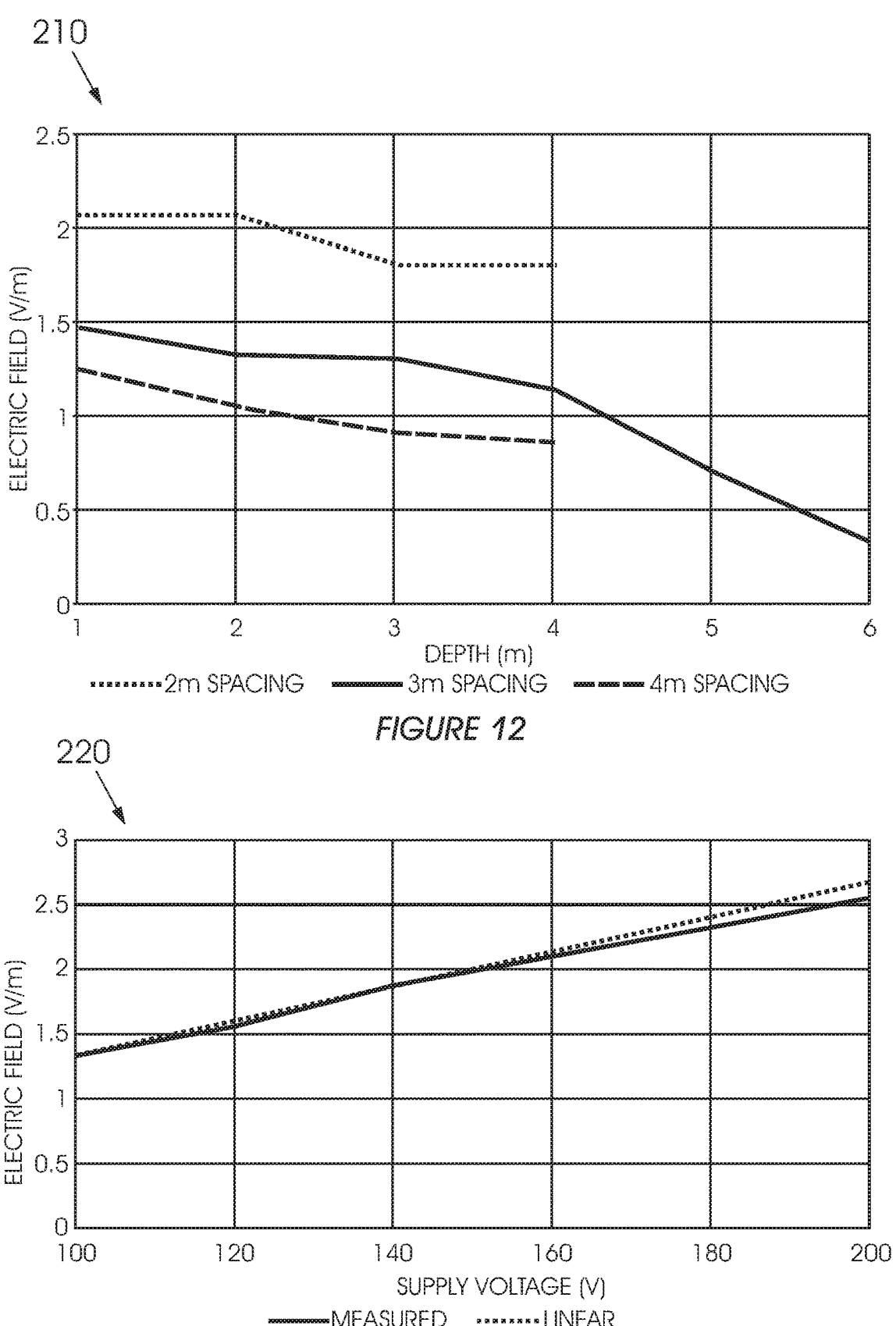
FIG. 12 is a graph showing measured electric field for different electrode spacings and depths, as measured during testing of an exemplary shark repellent system.
FIG. 13 is a graph showing theoretical and measured electric field and supply voltage, as measuring during testing of the exemplary shark repellent system.

Referring to the graph 210 in FIG. 12, measurements were performed to obtain a baseline for the electric field generated by a single line of electrodes 122 in sea water. An electric pulse was generated between the electrodes and the resulting electric field pulse peak was measured using an oscilloscope coupled to a probe. FIG. 12 shows the effect of electrode spacing and on the resultant electric field. The supply voltage was set to 100 V. As expected, electric field is reduced with larger separation distance. Field is also reduced by around 20% from 1 m to 4 m depth.

The graph 220 in FIG. 13 shows the effect of the supply voltage on the electric field. The field was measured at the centre of 5 m electrodes spaced 3 m apart at a depth of 3 m. Voltage was raised in 20 V increments from 60 V to 200 V DC. The resultant field is almost linear with the rise of supply voltage. For comparison a linear extrapolation is shown—it can be seen that effectiveness is slightly reduced at higher voltages.

Figures 14, 15:
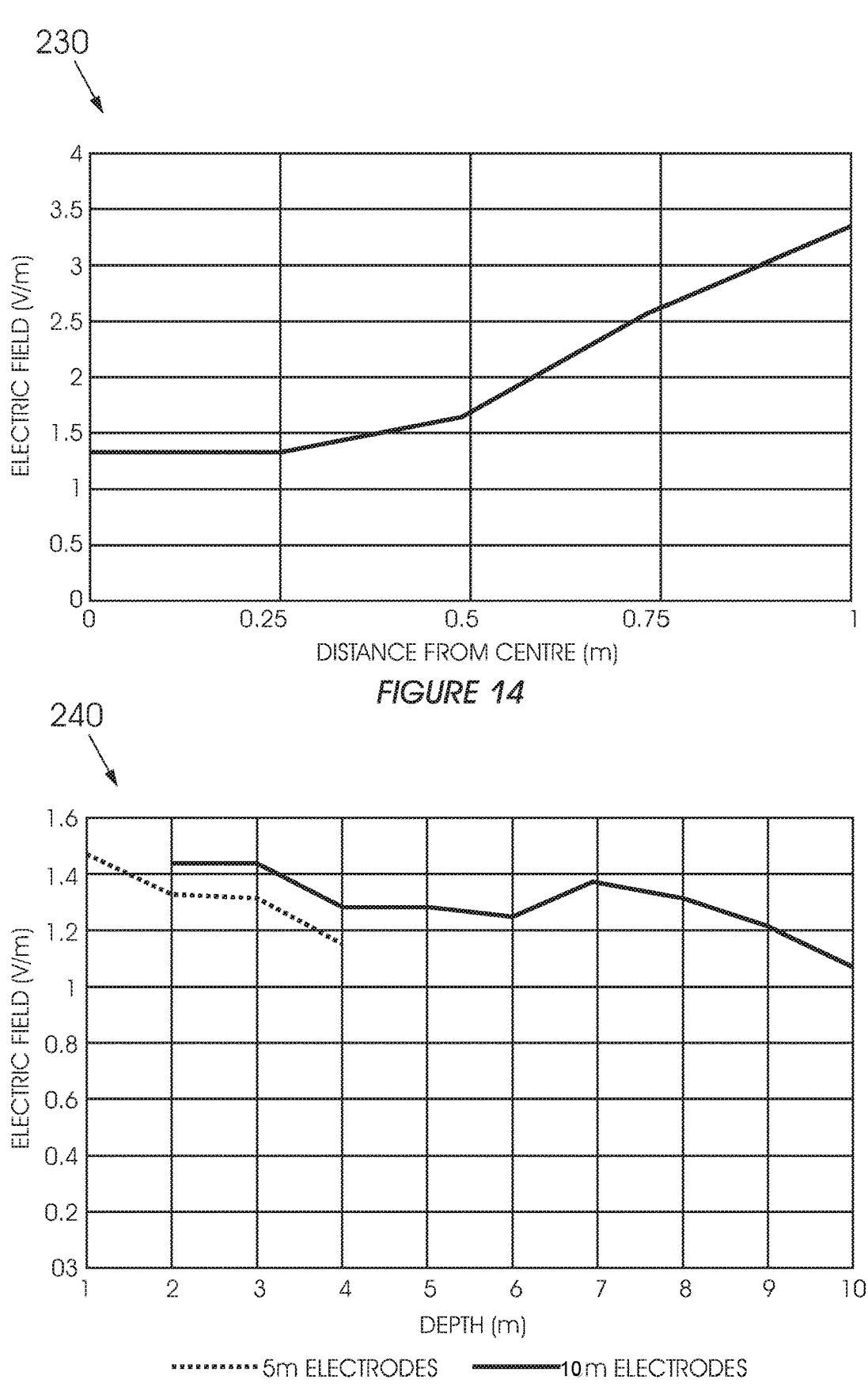
FIG. 14 is a graph showing an electric field profile at different distances from the centre between an electrode pair, as measured during testing of an exemplary shark repellent system.
FIG. 15 is a graph showing an electric field profile for different electrode lengths at various depths, as measuring during testing of an exemplary shark repellent system.

The graph 230 in FIG. 14 shows how the electric field changes as the probe is moved from the central point between a pair of electrodes towards the positive electrode. The field was measured using 5 m electrodes spaced 3 m apart at a depth of 3 m. Supply voltage was again set at 100 V. As expected the field strength increases as the probe comes closer to the electrode.

Finally the graph 240 in FIG. 15 shows the impact of depth on electric field for two different electrode lengths, being a 5 m electrode and a 10 m electrode. Measuring was performed by lowering the probe in the middle of the electrode pair to the depth of the electrodes. Again the spacing was 3 m and supply voltage was 100 V. Surprisingly, the longer electrodes did not show a large drop when compared to the shorter electrodes.

Figure 16:
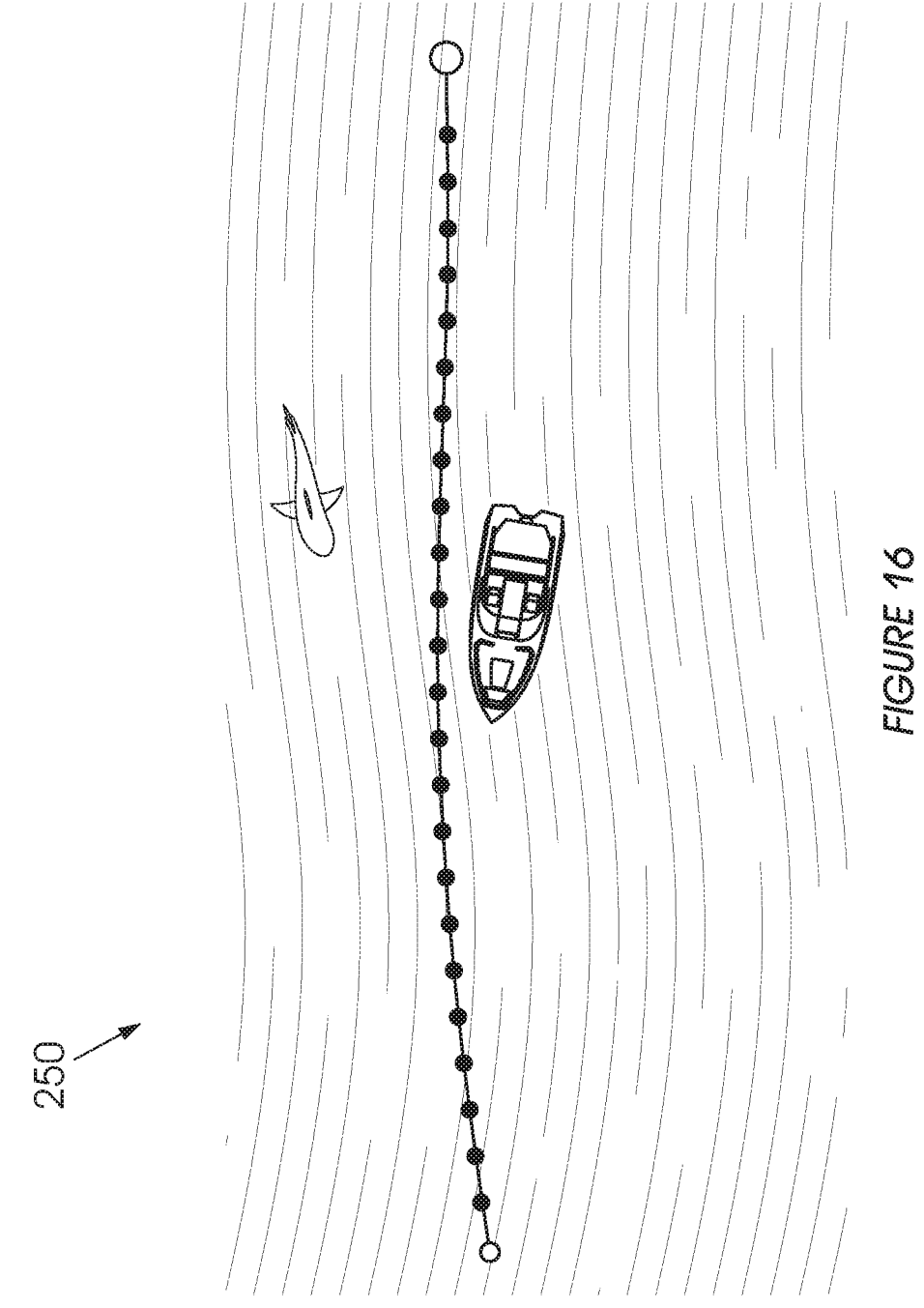
FIG. 16 is an illustration of how deployment of a barrier according to the invention was tested at sea.

The illustration 250 of FIG. 16 shows how a floating cable assembly was deployed at sea to test the deploy-ability of the shark repellent system 100. The barrier was attached to anchored floats at both ends and it was found that the system can be very easily deployed.

The applicant believes that embodiments of the invention may provide numerous advantages.

The invention advances the state of technology in that it creates a more comprehensive, robust and flexible shark repellent solution, while still being based on electric field technology which has been proven to deter sharks without significantly affecting other marine animals.

Making a swimming area shark-safe has a significant positive impact on the commercial activities surrounding the area. With safety and health laws becoming more restrictive, it is imperative that organisers of beach events such as surfing competitions have a method to prevent attacks on competitors. The system according to embodiments of the invention is very easy to deploy and move around which could present a new, effective and safe way to protect swimmers, surfers and divers in shark attack hotspots around the globe.

Another advantage of the system is that the barrier and controller are capable of wireless communication with multiple remote devices. The status of the pods can be monitored and tested from a remote location and the barrier can be controlled using remote devices. Sophisticated data analytics can be employed based on the data logged by the controller.

The system does not require the use of nets or other arrangements which could trap or entangle animals. Furthermore, the flexibility of the system is enhanced by the option of employing it in "reverse" configuration with electrodes floating upwardly from anchored pods, as described.

As mentioned above, while the specification refers to repelling sharks, the same system and method as described herein may also be effective in repelling other aquatic creatures.

Figure 17:
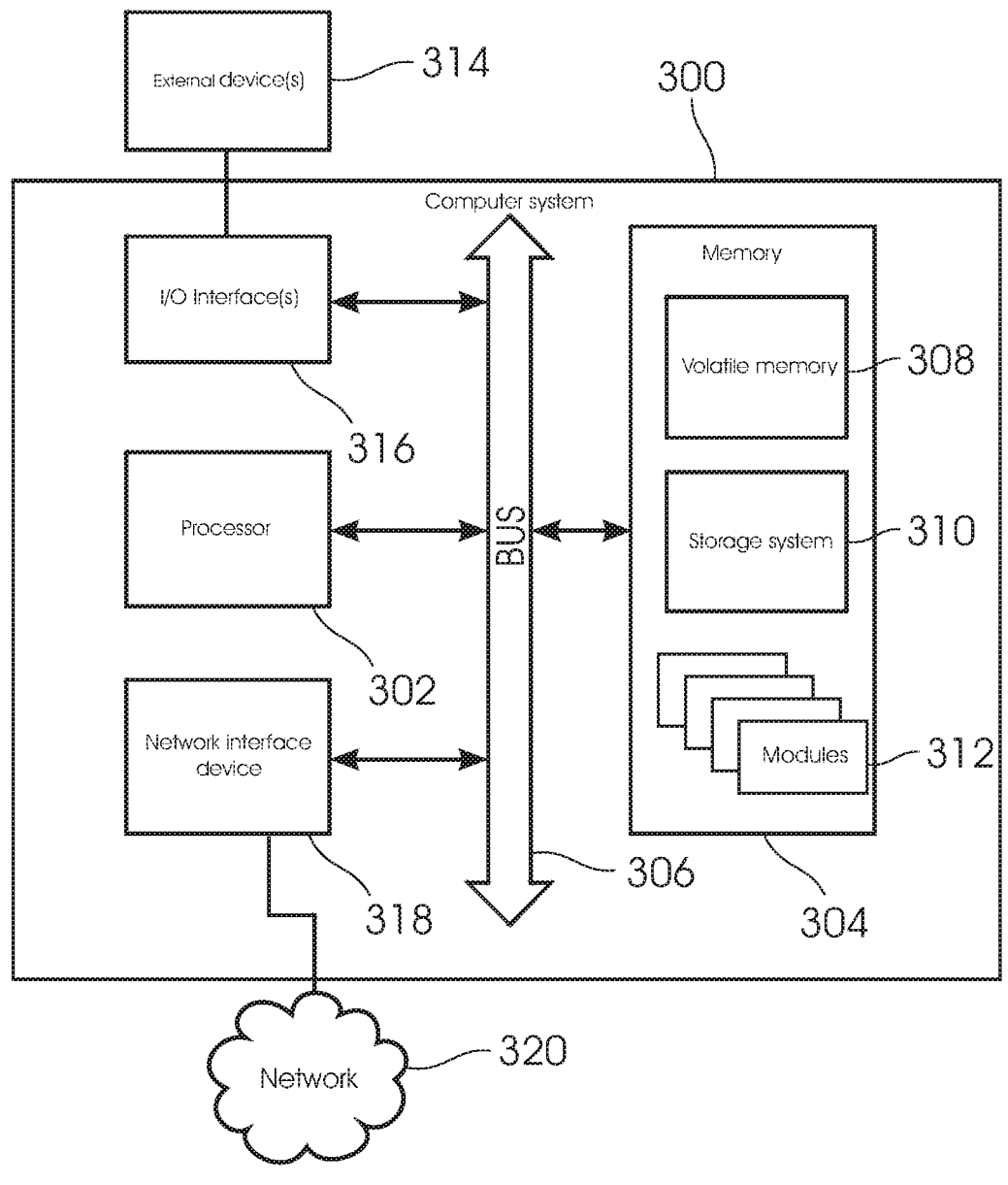
FIG. 17 is a block diagram of an exemplary computer system capable of executing a computer program product to provide functions and/or actions according to various aspects of the invention.

The techniques described above may be implemented in or using one or more computer systems, such as the computer system 300 shown in FIG. 17. The computer system 300 may be or include any suitable computer or server. The computer system 300 may be implemented in distributed cloud computing environments where tasks are performed by remote processing devices that are linked through a communications network. In a distributed cloud computing environment, program modules executed by the computer system 300 may be located both locally and remotely.

The station 150, the device 160, the pods 120 and/or the controller 130 may include a computer system such as the system 300.

In the example shown in FIG. 17, the computer system 300 has features of a general-purpose computer. These components may include, but are not limited to, at least one processor 302, a memory 304 and a bus 306 that couples various components of the system 300 including the memory 304 to the processor 302. The bus 306 may have any suitable type of bus structure. The computer system 300 may include one or more different types of readable media, such as removable and non-removable media and volatile and non-volatile media.

The memory 304 may thus include volatile memory 308 (e.g. random access memory (RAM) and/or cache memory) and may further include other storage media such as a storage system 310 configured for reading from and writing to a non-removable, non-volatile media such as a hard drive. It will be understood that the computer system 300 may also include or be coupled to a magnetic disk drive and/or an optical disk drive (not shown) for reading from or writing to suitable non-volatile media. These may be connected to the bus 306 by one or more data media interfaces.

The memory 304 may be configured to store program modules 312. The modules 312 may include, for instance, an operating system, one or more application programs, other program modules, and program data, each of which may include an implementation of a networking environment. The components of the computer system 300 may be implemented as modules 312 which generally carry out functions and/or methodologies of embodiments of the invention as described herein. It will be appreciated that embodiments of the invention may include or be implemented by a plurality of the computer systems 300, which may be communicatively coupled to each other.

The computer system 300 may operatively be communicatively coupled to at least one external device 314. For instance, the computer system 300 may communicate with external devices 314 in the form of a modem, keyboard and display. These communications may be effected via suitable Input/Output (I/O) interfaces 316.

The computer system 300 may also be configured to communicate with at least one network 320 (e.g. the Internet or a local area network) via a network interface device 318/network adapter. The network interface device 318 may communicate with the other elements of the computer system 310, as described above, via the bus 306.

The components shown in and described with reference to FIG. 17 are examples only and it will be understood that other components may be used as alternatives to or in conjunction with those shown.

Aspects of the present invention may be embodied as a system, method and/or computer program product. Accordingly, aspects of the present invention may take the form of hardware, software and/or a combination of hardware and software that may generally be referred to herein as "components", "units", "modules", "systems", "elements", or the like.

Furthermore, aspects of the present invention may take the form of a computer program product embodied in one or more computer-readable storage medium having computer-readable program code embodied thereon. A computer-readable storage medium may, for instance, be an electronic, magnetic, optical, electromagnetic, infrared, or semiconductor system, apparatus, or device, or any suitable combination of the above. In the context of this specification, a computer-readable storage medium may be any suitable medium capable of storing a program for execution or in connection with a system, apparatus, or device. Program code/instructions may execute on a single device, on a plurality of devices (e.g., on local and remote devices), as a single program or as part of a larger system/package.

The present invention may be carried out on any suitable form of computer system, including an independent computer or processors participating on a network of computers. Therefore, computer systems programmed with instructions embodying methods and/or systems disclosed herein, computer systems programmed to perform aspects of the present invention and/or media that store computer-readable instructions for converting a general purpose computer into a system based upon aspects of the present invention, may fall within the scope of the present invention.

Chart(s) and/or diagram(s) included in the figures illustrate examples of implementations of one or more system, method and/or computer program product according to one or more embodiment(s) of the present invention. It should be understood that one or more blocks in the figures may represent a component, segment, or portion of code, which comprises one or more executable instructions for implementing specified logical function(s). In some alternative implementations, the actions or functions identified in the blocks may occur in a different order than that shown in the figures or may occur concurrently.

It will be understood that blocks or steps shown in the figures may be implemented by system components or computer program instructions. Instructions may be provided to a processor of any suitable computer or other apparatus such that the instructions, which may execute via the processor of the computer or other apparatus, establish or generate means for implementing the functions or actions identified in the figures.

The invention claimed is:

1. A shark repellent system comprising:
   a shark repellent barrier configured to be positioned in an ocean and which includes a plurality of electronic pods configured to be spaced apart in a row of the pods along a length of the barrier, wherein each pod has an electrode of a plurality of electrodes attached thereto, the electrode of said each pod being configured to extend substantially vertically from said each pod through a water, in use, the barrier thus defining the row of the pods and the electrodes, and the pods being configured to apply electrical pulses to the electrodes to form an electric field between the electrodes that are adjacent, wherein the barrier is configured to generate an electric field strength, at a distance of 1 m, of at least 1 V·m⁻¹ substantially along the length of the barrier to repel sharks from a vicinity of the electrodes,
   a supply cable for supplying electrical power to the pods, said each pod being connected to the supply cable, and
   a mooring arrangement for securing the barrier to a structure, vessel or coastal feature;
a controller connected to the barrier via the supply cable and/or the mooring arrangement, wherein the controller is configured to transmit firing instructions to the pods in order to coordinate the electrical pulses generated, and is configured to monitor operation and/or status of the pods; and
at least one remote device wirelessly connected to the controller, wherein the at least one remote device is configured to permit a user of the at least one remote device to:
   remotely activate and deactivate the barrier, the pods individually, and/or the controller,
   check feedback from the controller regarding the operation and/or the status of the pods, and
   carry out testing of the barrier and/or the controller.

2. The system according to claim 1, wherein the pods are buoyant electronic pods configured to be spaced apart along the length of the barrier, wherein said each electrode attached to said each pod is configured to be suspended downwardly from said each pod through the water, in use, thereby defining a fully floating barrier which is not anchored to an ocean floor.

3. The system according to claim 2, wherein the barrier includes floats or buoys located between the pods to ensure that the pods remain at or near an ocean surface, in use.

4. The system according to claim 1, wherein the barrier is configured such that the electrodes are spaced between 2 m and 4 m apart, in use, with a differential voltage between the electrodes that are adjacent of at least 100 V to 120 V.

5. The system according to claim 1, wherein said each electrode has a length selected such that the barrier generates the electric field continuously from 100 mm to 300 mm below an ocean surface to about 400 to 600 mm above an ocean floor.

6. The system according to claim 1, wherein the controller is configured to instruct the pods to fire in such a manner that an electric field polarity is reversed periodically or such that the electric field polarity is alternated.

7. The system according to claim 1, wherein the barrier is configured to apply a pulse waveform in a shape of a standard exponential decay waveform with a time constant of 0.3±0.05 ms, the standard exponential decay waveform being defined as follows:

$$\varepsilon(t) = \varepsilon.\text{sub.Peak } e{-}t/T,$$

where ε.sub.Peak is a peak electric field strength, it is time in seconds and T is the time constant.

8. The system according to claim 7, wherein a pulse repetition rate is 1 s for alternating the electrical pulses such that said each pod fires every 2 s.

9. The system according to claim 1, wherein the controller is configured to transmit at least the following feedback to the at least one remote device: operational status of the controller, operational status and performance of said each pod, supply current and/or voltage to said each pod, and data relating to testing of system components.

10. The system according to claim 1, wherein the barrier and the controller are mobile.

11. The system according to claim 1, wherein the controller is a portable control assembly configured to be positioned in close proximity to the mooring arrangement, the controller being connected to a power supply and to an Internet such that the controller can communicate with the at least one remote device.

12. The system according to claim 1, wherein the controller or the at least one remote device is configured to trigger an alarm message when a failure or danger is detected.

13. The system according to claim 12, wherein the alarm message is triggered when the controller or the at least one remote device detects that one of the pods is not operational or not functioning correctly.

14. The system according to claim 1, wherein the at least one remote device includes two types of remote devices: a remote station and a remote monitoring device.

15. The system according to claim 14, wherein the remote station is a dedicated, fixed physical station and the remote monitoring device is a mobile communications device.

16. The system according to claim 14, wherein the remote station is used to record all data logged or received by the controller.

17. The system according to claim 1, wherein the pods are configured to be spaced apart along the length of the barrier at or near an ocean floor, and wherein the electrode attached to said each pod is configured to extend upwardly from said each pod through the water, in use.

18. The system according to claim 17, wherein the pods are anchored to the ocean floor.

19. A method of repelling sharks which comprises:
deploying a shark repellent system comprising:

a shark repellent barrier configured to be positioned in an ocean and which includes a plurality of electronic pods configured to be spaced apart in a row of the pods along a length of the barrier, wherein each pod has an electrode of a plurality of electrodes attached thereto, the electrode of said each pod being configured to extend substantially vertically from said each pod through a water, in use, the barrier thus defining the row of the pods and the electrodes, and the pods being configured to apply electrical pulses to the electrodes to form an electric field between the electrodes that are adjacent, wherein the barrier is configured to generate an electric field strength, at a distance of 1 m, of at least 1 $V \cdot m^{-1}$ substantially along the length of the barrier to repel sharks from a vicinity of the electrodes, a supply cable for supplying electrical power to the pods, said each pod being connected to the supply cable, and a mooring arrangement for securing the barrier to a structure, vessel or coastal feature;

a controller connected to the barrier via the supply cable and/or the mooring arrangement, wherein the controller is configured to transmit firing instructions to the pods in order to coordinate the electrical pulses generated, and is configured to monitor operation and/or status of the pods; and at least one remote device wirelessly connected to the controller, wherein the at least one remote device is configured to permit a user of the at least one remote device to:

remotely activate and deactivate the barrier, the pods individually, and/or the controller, check feedback from the controller regarding the operation and/or the status of the pods, and carry out testing of the barrier and/or the controller, such that the shark repellent barrier of the system is installed in the ocean;

generating the electric field to repel the sharks from the vicinity of the barrier; and controlling and monitoring the barrier using the controller and the at least one remote device of the system.

* * * * *